Oct. 28, 1969     E. J. DONALDSON     3,474,986

TWO-DEGREE GYRO FOR A TELEVISION CAMERA

Filed March 31, 1966     2 Sheets-Sheet 1

INVENTOR.
EARL J. DONALDSON
BY
Michael F. Oglo
ATTORNEY.

Oct. 28, 1969        E. J. DONALDSON        3,474,986

TWO-DEGREE GYRO FOR A TELEVISION CAMERA

Filed March 31, 1966        2 Sheets-Sheet 2

INVENTOR.
EARL J. DONALDSON
BY
Michael F. Oglo
ATTORNEY.

United States Patent Office 3,474,986
Patented Oct. 28, 1969

3,474,986
TWO-DEGREE GYRO FOR A TELEVISION CAMERA
Earl J. Donaldson, China Lake, Calif., assignor to the United States of America as represented by the Secretary of the Navy
Filed Mar. 31, 1966, Ser. No. 540,157
Int. Cl. F42b *15/02, 13/30;* F41g *9/00*
U.S. Cl. 244—3.1       3 Claims The invention described herein may be manufactured and used by or for the Government of the United States of America for governmental purposes without the payment of any royalties thereon or therefor.

This invention relates to a two-degree-of-freedom gyroscopically stabilized gimbal system for holding a television camera tube and lens system with its line-of-sight axis in fixed orientation relative to inertial space. More particularly, the invention has special utility in conjunction with television guidance control systems for small guided missiles. One such television guidance system is disclosed in the copending application of Jack A. Crawford et al., Ser. No. 224,594, filed Sept. 12, 1962, and entitled "Television Tracking System."

An object of the invention is to provide a novel two-degree-of-freedom gyroscopically stabilized gimbal system adapted to be mounted within the relatively confined space limitations of a small missile and which holds a camera tube for space stabilization of its line-of-sight axis.

Another object is to provide a novel construction in accordance with the previous objective in which the line-of-sight axis of the television tube may be space stabilized throughout a cone of possible look angles having an included angle of the order of 60°.

Other objects and many of the attendant advantages of this invention will be readily appreciated as the same becomes better understood by reference to the following detailed description when considered in connection with the accompanying drawings wherein.

Figure 1:
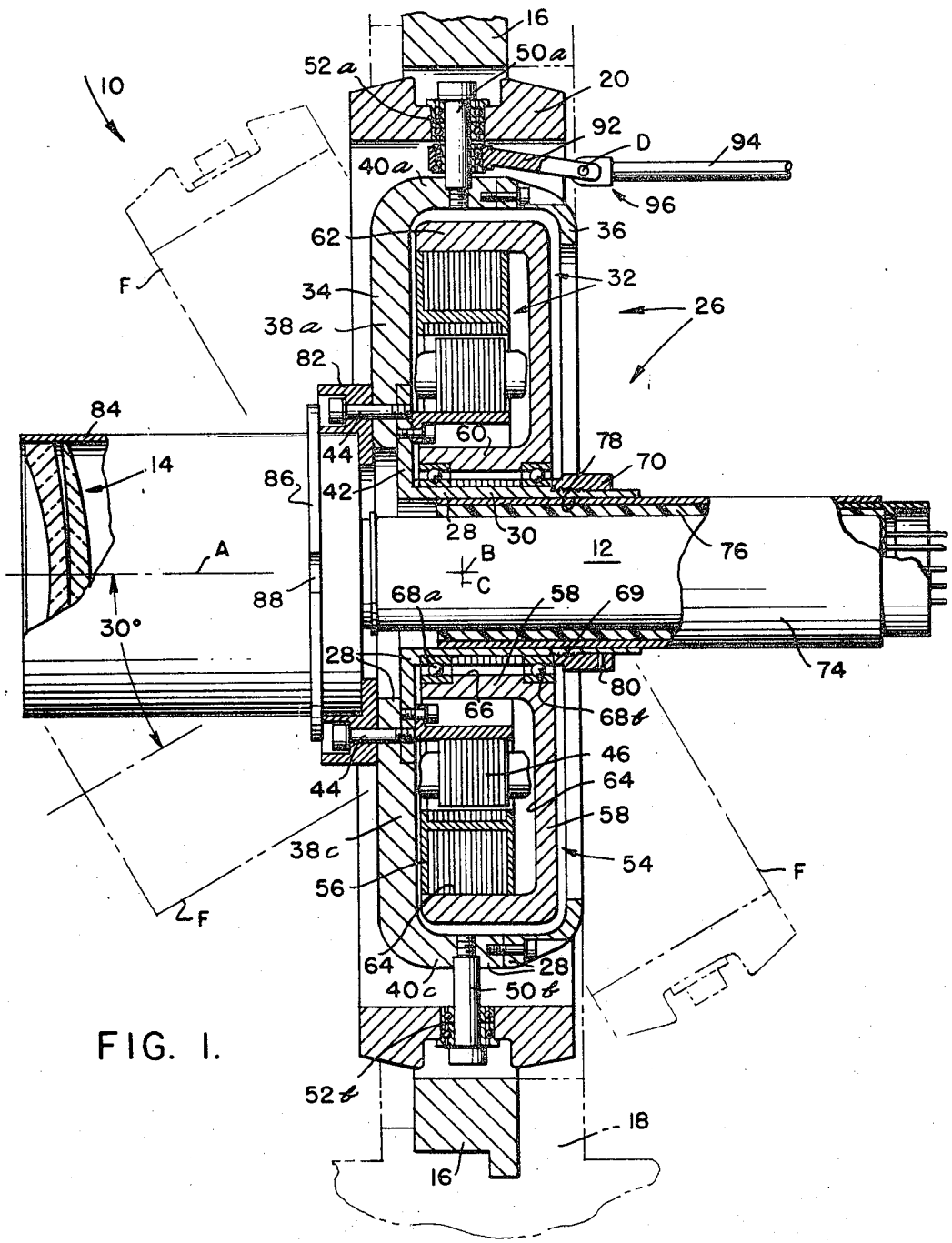
FIG. 1 is a central section of the subject of the invention, certain parts being shown in side elevation.

Referring now in detail to the drawing, the subject of the invention is a two-degree of freedom gyroscopically stabilized gimbal system 10, for holding the line of a sight axis A of a television camera tube 12, and associated lens system 14, in fixed orientation relative to inertial space. Gimbal system 10 is shown in the drawing with its elements in their neutral or zero deflection positions about the gimbal axes. In this neutral position, system 10 has the appearance of a generally concentric organization about axis A, as may be best seen in FIG. 2. The outermost element of the system is a gimbal pin support ring 16, which is immovably secured to some suitable structural portion 18, shown in phantom. In the case of employing the television camera for the guidance system of a missile, mentioned in the introductory remarks, structural portion 18 may be a transverse rib of the missile airframe. An outer gimbal ring 20 is disposed within support ring 16, and is pivotally mounted thereto by a pair of aligned gimbal pins 22a, 22b, which project outwardly from ring 20 and are journaled in roller bearings 24a, 24b, carried by the support ring. The resultant pivot axis B, through the gimbal pins form one of the gimbal system axes.

The structure within the outer gimbal is collectively designated an inner gimbal and rotor assembly 26, and generally comprises a nonspinning frame subassembly 28, including a central rearwardly extending tubular hub 30. An annular rotor subassembly 32 is journaled about tubular hub 30.

Figure 2:
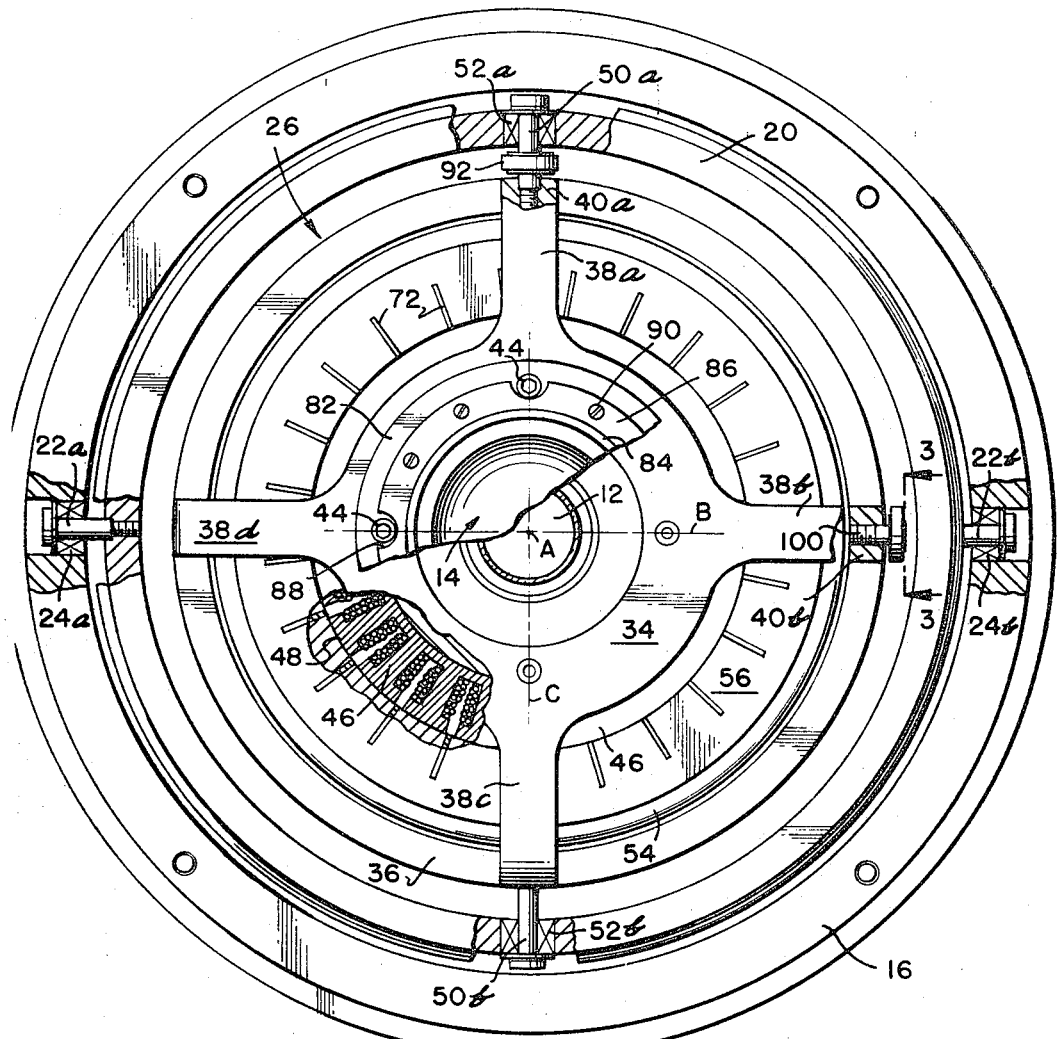
FIG. 2 is a reduced front elevation of the device of FIG. 1.

Frame subassembly 28 somewhat resembles an electric motor bell housing except that it has the tubular hub 30. It is made of three pieces consisting of a cast aluminum four-armed spider 34, a stiffener ring 36, and the hub 30. Four-armed spider 34 is an integral casting having a central aperture. The four arms of the spider 38a, 38b, 38c and 38d are disposed in quadrature relation, with the opposite pair of arms 38b, 38d, in parallel alignment with axis B. The construction of spider 34 further includes integral lateral feet portions 40a, 40b, 40c and 40d which extend rearwardly from the outer ends of each of the corresponding arms. The stiffener ring 36 is attached to the rear edges of these lateral feet. A radial flange 42 is integrally formed at the front of hub 30. Flange 42 fits in a recess form in the rear face of spider 34, and tubular hub 30 is secured to the spider by screws 44 which extend through the spider and engage tapped holes in the flange. A stator winding ring 46 is affixed to the rear face of flange 42. Ring 46 is of a type for driving a hysteresis-type motor and is further adapted for use in the so-called inside-outside mode of motor construction, in which an annular rotor rotates about a central stator. For this reason the individual pole faces 48, FIG. 2, are formed on the outer periphery of the ring, which is opposite that found in connection with the usual form of motor construction in which the rotor is disposed within the stator ring. The lateral feet portion 40a and 40c at the end of spider arms 38d and 38c each carry outwardly projecting gimbal pins 50a, 50b which are journaled in roller bearings 52a, 52b carried by outer gimbal ring 20. The axis C through the trunion pins forms the other axis of the gimbal system.

Annular rotor subassembly 32 comprises a rotor frame 54 and a hysteresis rotor element 56. Frame 54 is formed as an integral casting having radial wall portion 58 and integral axial flanges portions 60 and 62 at the inner and outer peripheries of portion 58. The flanges extend forwardly and together with wall portion 58 form a forwardly open annular channel 64. The inner surface 66 of the inner peripheral flange 60 is journaled about tubular hub 30 with a pair of roller bearings 68a, 68b therebetween. Exterior threads 69 are formed on the outside of tubular hub 30 adjacent to the rear side of rotor frame 54, and a stop nut 70 is screwed thereon to restrain the rotor and bearings against axial movement. Rotor ring element 56 is immovably mounted within outer peripheral flange 62 with a force fit. The inner surface of rotor ring 56 contains the conventional iron slug inserts 72 of a hysteresis motor, and is separated from the surface of the stator 46 by only a small clearance.

Television tube 12 is rigidly supported within a metal tube 74 by means of a potting material 76 flowed therebetween. Tube 74 is adapted for sliding engagement within the bore 78 of tubular hub 30. After focusing adjustments are made, tube 74 is locked in place by one or more set screws 80, which extend through stop nut 70. A rigid mounting ring 82, for receiving lens system 14, is attached to the front face of spider 34 by the same screws 44 used to attach the flange 42 to the spider. The lens system 14 is encased by a housing tube having a flange 86 adjacent to its rear end. Flange 86 has notches 88 formed in its outer edge to permit access to screws 44. Flange 86 is secured to mounting ring 82 by a plurality of screws 90.

Figure 3:
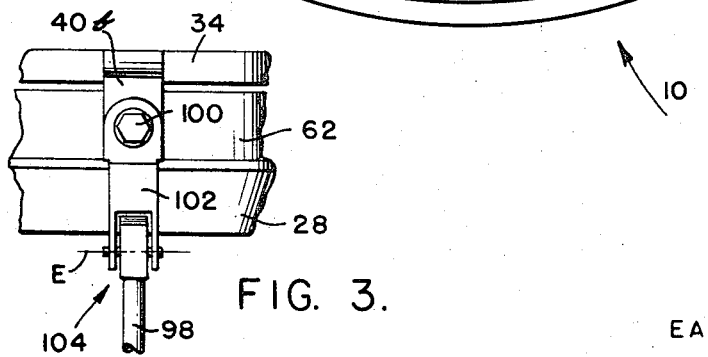
FIG. 3 is an enlarged view taken along lines 3—3, FIG. 2.

A member 92, consisting of an integral bearing and link arm, is pivotally mounted to gimbal pin 50a. The other end of the link arm is connected to a push-pull rod 94 by a joint 96 adapted to provide a pivot axis D, perpendicular to the plane of the drawing. Push-pull rod 94 serves the dual purpose of translating gyro precessing forces from a torque actuator, not shown, to outer gimbal ring 20, and of translating any deflection of gimbal 20 from its neutral position to an electric displacement signal generating device, not shown. One highly successful embodiment employed a rotary torque motor having a crank arm as its torque actuator. The other end of push-pull rod 94 was connected to the outer end of the crank arm by a spherical bearing and ball joint. Also in that embodiment the displacement signal generator consisted of a shaft position pickoff coupled to the torque motor shaft. Referring now to FIGS. 2 and 3, another push-pull rod 98 serves the purpose of translating torque forces, and sensing displacements, to and from inner gimbal and rotor assembly 26. However, in this case the point of connection is a special pivot pin 100 projecting from lateral foot portion 40b. Rod 98 is connected to pin 100 by a scheme similar to that used with rod 94. An integral bearing and link arm member 102 is pivoted about pin 100 with the end of the link arm connected to push-pull rod 98 by a joint 104, providing pivot action about axis E.

In operation, current is supplied to the stator windings of stator ring 46, which drives the hysteresis wheel 56 and in turn the rotor subassembly 32. The rotor spins at a relatively high angular velocity, of the order of 3400 revolutions per minute. In accordance with well known principles, the plane of rotation of the rotor always tends to keep its orientation fixed in inertial space. This in turn keeps the line of sight axis A of the television camera tube 12 and lens system 14 fixed in inertial space. Thus, as the supporting structure 18 undergoes rotational movement about gimbal axis B or C, ring 20 and inner gimbal and rotor assembly 26 will deflect from their zero deflection positions. This relative deflection is converted to an electrical signal by the connection of push-pull rods 94 and 98 to the signal generators. The output of the signal generators may, in turn be used to operate control surfaces of a missile or the like. When it is desired to selectively shift the orientation of line of sight axis A about the gimbal axes, a force may be applied to gimbal pin 50a by rod 94 to cause gyroscopic precession of inner gimbal and rotor assembly 26 about axis C, and a force applied to pivot pin 100 by rod 98, to cause precession of outer gimbal about axis B.

An important feature of the invention is the structural organization of inner gimbal and rotor assembly 26, consisting of the provision of tubular hub 30 as an integral part of the inner gimbal, journaling the rotor subassembly 32 on the outside of the hub, and mounting the television tube 12 within the central bore 78 of hub 30. This organization permits the provision of a two-degree-of-freedom gyroscopically stabilized gimbal system with no portion of the gimbal structure obstructing the television tube's line of sight axis A. Another significant feature is the structural organization of frame subassembly 28 and rotor subassembly 32, consisting of the folding of rotor frame 56 with its annular channel 62 within the bell-housing-like configuration of frame subassembly 28, and the placing of the inside-out hysteresis motor within the space provided by the channel. The resultant construction and arrangement is both thin in the axial direction and rugged. The thinness is very important because it permits construction of a gimbal system capable of relatively large deflection angles of the line-of-sight axis within a confined space. For example, one highly successful operational embodiment of system 10 provides a capability of deflection of the line of sight axis A throughout a cone having an included angle of 60° (30° to each side of the neutral axis). This capability has been illustrated in FIG. 1, where phantom lines F show the position of inner gimbal rotor assembly 26 when line of sight axis A is deflected 30° from its neutral position about gimbal axis C.

What is claimed is:
1. In television camera mounting apparatus for supporting an elongated television camera tube in spaced stabilized relation to an angularly movable support structure, the combination, comprising:
 (a) an inner gimbal having a central hollow tubular hub,
 (b) an elongated television camera tube carried by the inner gimbal in co-axial alignment with its hub and having at least a portion thereof extending through the central opening in the hub,
 (c) a gyro rotor journaled on the outside of the tubular hub,
 (d) an electric motor for rotating said gyro rotor comprising a concentrically aligned annular stator element of the motor affixed to the inner gimbal and a co-operating annular rotor element of the motor affixed to the gyro rotor, and
 (e) an outer gimbal adapted to pivotally support the inner gimbal about a first gimbal axis transverse to the hub, and to be gimbaled to the support structure about a second gimbal axis transverse to the first gimbal axis and to the axis of the tubular hub.
2. Apparatus in accordance with claim 1, wherein:
 (f) said inner gimbal is made of two parts comprising a four-armed spider having its legs extending in radial and quadrature relation about the tubular hub, and having laterally extending feet and a stiffener ring securing the ends of the feet together,
 (g) said gyro rotor comprising a rotor frame having a U-shaped radial cross section forming an open annular channel, said rotor frame being disposed within the lateral feet of the inner gimbal with the open annular channel facing the legs of the spider, and
 (h) said elements of the electric motor being disposed within the annular channel.
3. Apparatus in accordance with claim 2 and further for selectively positioning the camera with two degrees of freedom in axes transverse to the camera axis,
 (i) said inner and outer gimbals being pivotally connected by gimbal pins through a first pair of diametrically opposite feet of the inner gimbal frame,
 (j) a first rod adapted for rectilinear movement in a generally axial direction and pivotally connected to one of said gimbal pins through said first pair of feet and adapted to apply force to the gimbal pin to selectively precess the gyro about the gimbal axis transverse to the gimbal axis through said first pair of feet,
 (k) a second rod adapted for rectilinear movement in a generally axial direction and pivotally connected to a pivot pin through one of the feet of the second pair of diametrically opposite feet to selectively apply force to the pivot pin to precess the gyro about the other gimbal axis.

References Cited

UNITED STATES PATENTS

| | | | |
|---|---|---|---|
| 2,959,375 | 11/1960 | Dunnegan | 244—3.14 |
| 2,963,242 | 12/1960 | Mueller | 244—3.2 |
| 3,337,161 | 8/1967 | Halton | 244—3.14 |

VERLIN R. PENDEGRASS, Primary Examiner

U.S. Cl. X.R.

244—3.14